D. J. MAHONEY.
ATTACHMENT FOR PLANTERS.
APPLICATION FILED APR. 4, 1912.
1,035,025.
Patented Aug. 6, 1912.
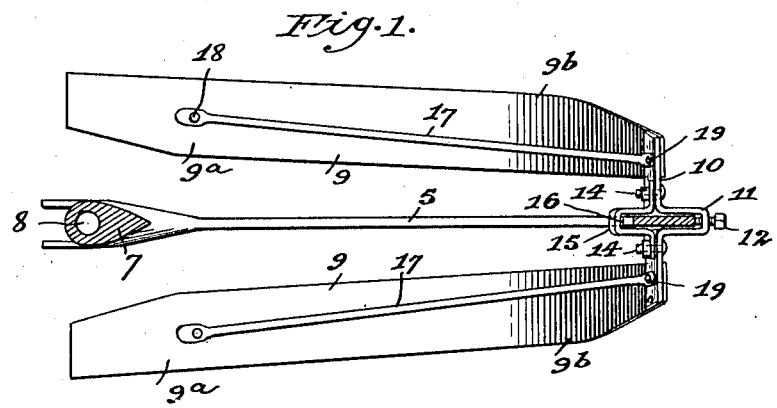
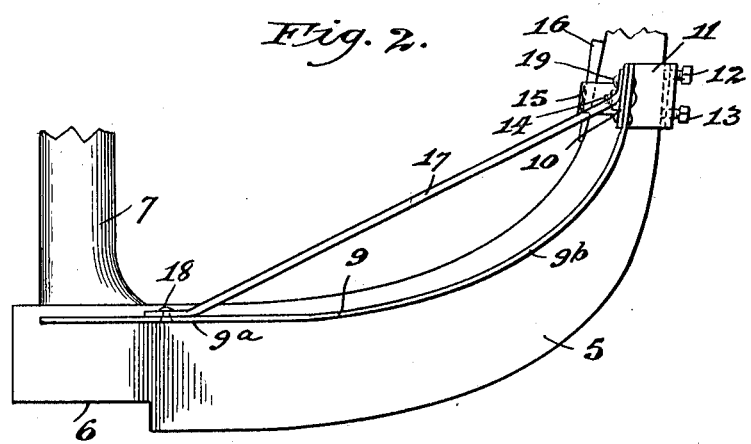
Witnesses,
Inventor,
Denis J. Mahoney,
By Offield, Towle, Graves & Offield
Attys.

UNITED STATES PATENT OFFICE.

DENIS J. MAHONEY, OF WINONA, MINNESOTA.

ATTACHMENT FOR PLANTERS.

1,035,025.  Specification of Letters Patent.  Patented Aug. 6, 1912.

Application filed April 4, 1912. Serial No. 688,454.

*To all whom it may concern:*

Be it known that I, DENIS J. MAHONEY, a citizen of the United States, residing at Winona, in the county of Winona, State of Minnesota, have invented certain new and useful Improvements in Attachments for Planters, of which the following is a specification.

My invention relates to planters, and has reference more particularly to attachments thereto adapted for coöperation with the furrow opener to effect a smoothing of the furrow as it is opened by the blade and to regulate the depth of the furrow so as to insure the planting of the seed at a proper and uniform depth; and the main object of my invention is to provide an improved form of such attachment and to provide an improved means of adjustably securing the same to the upturned end of the furrow opening blade so as to effect both a rough and fine regulation of the depth of the furrow.

Another object of the invention is to provide an improved construction of planter gage which shall combine lightness of structure with a high degree of rigidity and strength.

To the above ends the invention consists in the novel devices and combinations of devices hereinafter described and particularly pointed out in the claims.

My invention, its mode of use, and its advantages will all be readily apparent from the following description, when taken in connection with the accompanying drawing, in which—

Figure 1 is a top plan view of my improved attachment applied in working position to the furrow opening blade and seed boot of a planter; and Fig. 2 is a side elevation of the parts shown in Fig. 1.

Referring to the drawing, 5 designates the forwardly and upwardly curved furrow opening blade, which is cut away at the rear end thereof, as shown at 6. Secured to the rear end of the blade 5, directly above the cutaway portion 6, is the usual seed-boot 7, through which is formed the passage 8 through which the seed is dropped by the seed-controlling valve (not shown) into the furrow opened by the blade 5.

My improved attachment comprises a pair of symmetrical shoe-blades 9, the rear portions $9^a$ of which are substantially flat, said blades being bowed upwardly on a gradual curve through their intermediate and forward portions $9^b$, as clearly shown in Fig. 2. The upper ends of the blades are rigidly connected by a transverse connecting bar 10; said bar being formed at its intermediate portion with a forwardly extending U-shaped loop 11 that overlaps the front edge of the blade 5; and threaded through the upper and lower portions of the transverse member of the loop 11 are a pair of set-screws 12 and 13, respectively, the inner ends of which are adapted to engage the forward edge of the blade 5.

Secured to the rear side of the cross-bar 10 as by short bolts 14 is a U-shaped metal strap 15 that embraces the rear edge of the blade 5 opposite the loop 11. This strap 15 may directly engage the rear edge of the blade 5, but preferably I employ, in association therewith, a wedge-shaped key 16 that is adapted to be driven tightly between the loop strap 15 and the rear edge of the blade, in the manner clearly shown in Fig. 2. It will thus be seen that the members 11 and 15, together with the key 16, constitute a clamp whereby the forward end of the attachment can be rigidly secured at any desired height upon the upturned end of the furrow opening blade, according to the depth at which it is desired to plant the seed. When the attachment has been thus roughly set to the desired height, the rear or working portion thereof can be more nicely or finely adjusted by manipulation of the set-screws 12 and 13. By adjusting the upper screw 12 outwardly and the lower screw 13 inwardly, the depth-determining portion $9^a$ of the attachment will be lowered; and, conversely, by adjusting inwardly the screw 12 and outwardly the screw 13, the said portion of the blades will be raised. It will thus be seen that the shoe-blades are wholly supported at and from the upturned end of the furrow-opening blade.

The curved shoe-blades are disposed substantially parallel to each other and to the furrow-opening blade throughout their entire length, and they are strengthened and stiffened by braces 17 connected at their opposite ends as by rivets 18 and 19 to the rear and forward portions of the shoe-blades, respectively, on the upper sides of the latter. This permits the employment of comparatively light metal for the shoe-blades themselves, consistently with the required strength and rigidity to resist the impact of obstacles such as stones, sod, and the like.

I claim—

1. In a planter, the combination with a furrow-opening blade having a forwardly extending upturned portion, of a pair of shoe-blades disposed substantially parallel with and on opposite sides of said furrow-opening blade, respectively, and means for supporting said shoe-blades wholly from the forward upturned end of said furrow-opening blade, comprising a transverse connecting bar rigidly uniting the forward upturned ends of said shoe-blades and means for rigidly securing said connecting bar to the forward upturned end of said furrow-opening blade.

2. In a planter, the combination with a furrow-opening blade having a forwardly extending upturned portion, of a pair of shoe-blades disposed on opposite sides of said furrow-opening blade and having upturned forward portions, means rigidly connecting the forward upper ends of said shoe-blades, and means for rigidly and adjustably clamping said connecting means to the front and rear edges of the forward upturned end of said furrow-opening blade.

3. In a planter, the combination with a furrow-opening blade having a forwardly extending upturned portion, of a pair of shoe-blades disposed on opposite sides of said furrow-opening blade and having forward upturned portions, a transverse connecting bar rigidly uniting the forward upturned ends of said shoe-blades, said connecting bar having formed therein a loop overlapping the front edge of said furrow-opening blade, a clamp strap secured at its ends to said connecting bar and having a similar loop overlapping the rear edge of said furrow-opening blade, and adjusting and clamping screws passed through the transverse member of the loop of said connecting bar and engaging the forward edge of said furrow-opening blade.

4. In a planter, the combination with a furrow-opening blade having a forwardly extending upturned portion, of a pair of shoe-blades disposed on opposite sides of said furrow-opening blade and having forward upturned portions, a transverse connecting bar rigidly uniting the forward upturned ends of said shoe-blades, said connecting bar having formed therein a loop overlapping the front edge of said furrow-opening blade, a clamp strap secured at its ends to said connecting bar and having a similar loop over-lapping the rear edge of said furrow-opening blade, adjusting and clamping screws passed through the transverse member of the loop of said connecting bar and engaging the forward edge of said furrow-opening blade, and a wedge-shaped key inserted between the transverse member of the loop of said clamp strap and the rear edge of said furrow-opening blade.

5. A planter attachment for regulating the depth of a furrow-opening blade, comprising a pair of transversely flat shoe-blades having upwardly curved forward ends, a rigid connecting bar between said forward ends, means for clamping said connecting bar to the furrow-opening blade of the planter, and braces connecting the forward and rear ends of said shoe-blades on the upper or curved sides thereof, respectively.

DENIS J. MAHONEY.

Witnesses:
W. A. MAHL,
CLARINA F. WITT.

---

Copies of this patent may be obtained for five cents each, by addressing the "Commissioner of Patents, Washington, D. C."